US009064029B2

(12) United States Patent
D'Angelo et al.

(10) Patent No.: US 9,064,029 B2
(45) Date of Patent: Jun. 23, 2015

(54) DYNAMICALLY IDENTIFYING AND EVALUATING COMPONENT HIERARCHY FOR RENDERING CONTENT COMPONENTS ON A WEBPAGE

(75) Inventors: Adam D'Angelo, Palo Alto, CA (US); Charles Duplain Cheever, Palo Alto, CA (US); Kevin G. Der, Palo Alto, CA (US); Rebekah Marie Cox, Mountain View, CA (US)

(73) Assignee: Quora, Inc., Mountain View, CA (US)

( * ) Notice: Subject to any disclaimer, the term of this patent is extended or adjusted under 35 U.S.C. 154(b) by 255 days.

(21) Appl. No.: 12/795,504

(22) Filed: Jun. 7, 2010

(65) Prior Publication Data

US 2011/0302485 A1    Dec. 8, 2011

(51) Int. Cl.
*G06F 17/00* (2006.01)
*G06F 3/14* (2006.01)
*G06F 17/30* (2006.01)
*G06Q 10/10* (2012.01)

(52) U.S. Cl.
CPC .......... *G06F 17/30905* (2013.01); *G06Q 10/10* (2013.01)

(58) Field of Classification Search
CPC . G06F 17/00; G06F 17/227; G06F 17/30607; G06F 17/30654; G06F 17/30696; G06F 17/30861; G06F 17/30991
USPC ........................................................ 715/234
See application file for complete search history.

(56) References Cited

U.S. PATENT DOCUMENTS

2004/0216084 A1*  10/2004  Brown et al. ................. 717/102
2004/0267704 A1*  12/2004  Subramanian et al. ........... 707/3
2005/0021862 A1*   1/2005  Schroeder et al. ............ 715/513
2005/0203957 A1*   9/2005  Wang et al. ................ 707/104.1
2006/0218487 A1    9/2006  Ross et al.
2009/0177959 A1*   7/2009  Chakrabarti et al. ......... 715/234

OTHER PUBLICATIONS

Fiala, Zoltan, et al., "A component-based approach adaptive dynamic web documents", Journal of Web Engineering, vol. 2, No. 1 & 2, (2003), 058-073.
"Remote procedure call", Wikipedia® [online]. [retrieved Apr. 7, 2010]. Retrieved from the Internet: <URL: http://en.wikipedia.org/wiki/Remote_procedure_call>, (2010), 3 pgs.
Houben, Geert-Jan, et al., "Building Self-Managing Web Information Systems from Generic Components", *Program Electronic and Information Systems*, vol. 2, Issue 2, (2006), 15 pgs.

(Continued)

*Primary Examiner* — Kavita Padmanabhan
*Assistant Examiner* — Ariel Mercado
(74) *Attorney, Agent, or Firm* — Schwegman Lundberg & Woessner, P.A.

(57) ABSTRACT

A method to perform component-based rendering of a webpage includes identifying a component hierarchy from which to render the webpage. A set of components are selected from the component hierarchy as an evaluation component set. The evaluation component set is evaluated by determining that a particular component of the evaluation component set does not include a data request for data item to be used in the rendering of the webpage. Responsive to the determination, least one child component of the particular component is identified within the component hierarchy. The child component is added to the evaluation component set. The newly added component may be evaluated to determine whether the component requires data to be rendered. A batch module may identify data items that are subject to the data request in the evaluation component set, and may proceed to retrieve the data items as a batch from relevant data sources.

24 Claims, 11 Drawing Sheets

(56) References Cited

OTHER PUBLICATIONS

Nadar, K. M., "Wicket: A simplified framework for building and testing dynamic Web pages", *IBM.com/developerWorks*, (Nov. 4, 2008), 25 pgs.

"The HTML DOM defines a standard for accessing and manipulating HTML documents", [online]. Retrieved from the Internet: <URL: <http://itswtech.org/Lec/Programming%20for%20Internet/dom%205.pdf>, (Aug. 9, 2010), 10 pgs.

\* cited by examiner

DYNAMICALLY IDENTIFYING AND EVALUATING COMPONENT HIERARCHY FOR RENDERING CONTENT COMPONENTS ON A WEBPAGE

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2010, Quora, Inc. All Rights Reserved.

TECHNICAL FIELD

Example embodiments relate to generally to the field of electronic content generation and processing and, in some specific example embodiments, to a system and method of component-based webpage generation and update.

BACKGROUND

The delivery and presentation of content over the Internet from web servers to client applications has undergone a number of transformations since the World Wide Web (WWW) was first conceived in the last 1980s. In particular, the presentation of content has evolved from the use of relatively static presentation technologies using simple HyperText Markup Language (HTML) to a more dynamic and interactive presentation technologies. For example, the scripting language JavaScript (JavaScript is a trademark of Oracle Corporation) was developed in 1995 for use within webpages so as to provide enhanced client-side functionality within the context of a web browser, and also to enable dynamic updates to webpages. Such scripting languages, delivered with a webpage, can make HTTP requests to a server, and the responses from the server may be used to modify a current webpage, rather than creating a new page with each response. Accordingly, a web server needs only provide limited, incremental information for updates. Asynchronous JavaScript and eXtensible Markup Language (AJAX) is a group of interrelated web development technologies that deploy JavaScript.

Scripting languages are widely used to write functions that are included within HTML pages, and that interact with the Document Object Model (DOM) of the HTML page. Scripting language code may run locally within the context of a web browser, and can detect user actions, responsive to which certain activities and display changes can be rendered within the context of the web browser.

Looking more specifically at the Document Object Model (DOM), this is a cross platform language independent convention for representing and interacting with objects in web documents (e.g., HTML or XML documents). DOM has evolved into a World Wide Web Consortium (W3C) standard for accessing documents like HTML and XML. Specifically, the DOM may provide a platform and language-neutral interface that will ask programs and scripts to dynamically access and update the content, structure and style of a document. The HTML DOM provides a standard object model for HTML, as well as a standard programming interface for HTML. The HTML DOM defines objects and properties of HTML elements, and methods (e.g., interfaces) for accessing these elements. The DOM regards every element within an HTML document as being a node, and the HTML document has a tree-structure, called a node-tree. Nodes can be accessed through the node-tree, and contents of the node modified and deleted. New elements may also be created.

Notwithstanding the development of the above-described technologies, a number of technical challenges remain with respect to the efficient generating and updating of web content (e.g., HTML documents) by a web service. As the complexity and nature of content that is exposed via web services have changed, the limitations of existing solutions have become more pronounced.

BRIEF DESCRIPTION OF DRAWINGS

Some embodiments are illustrated by way of example and not limitation in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

Figure 1:
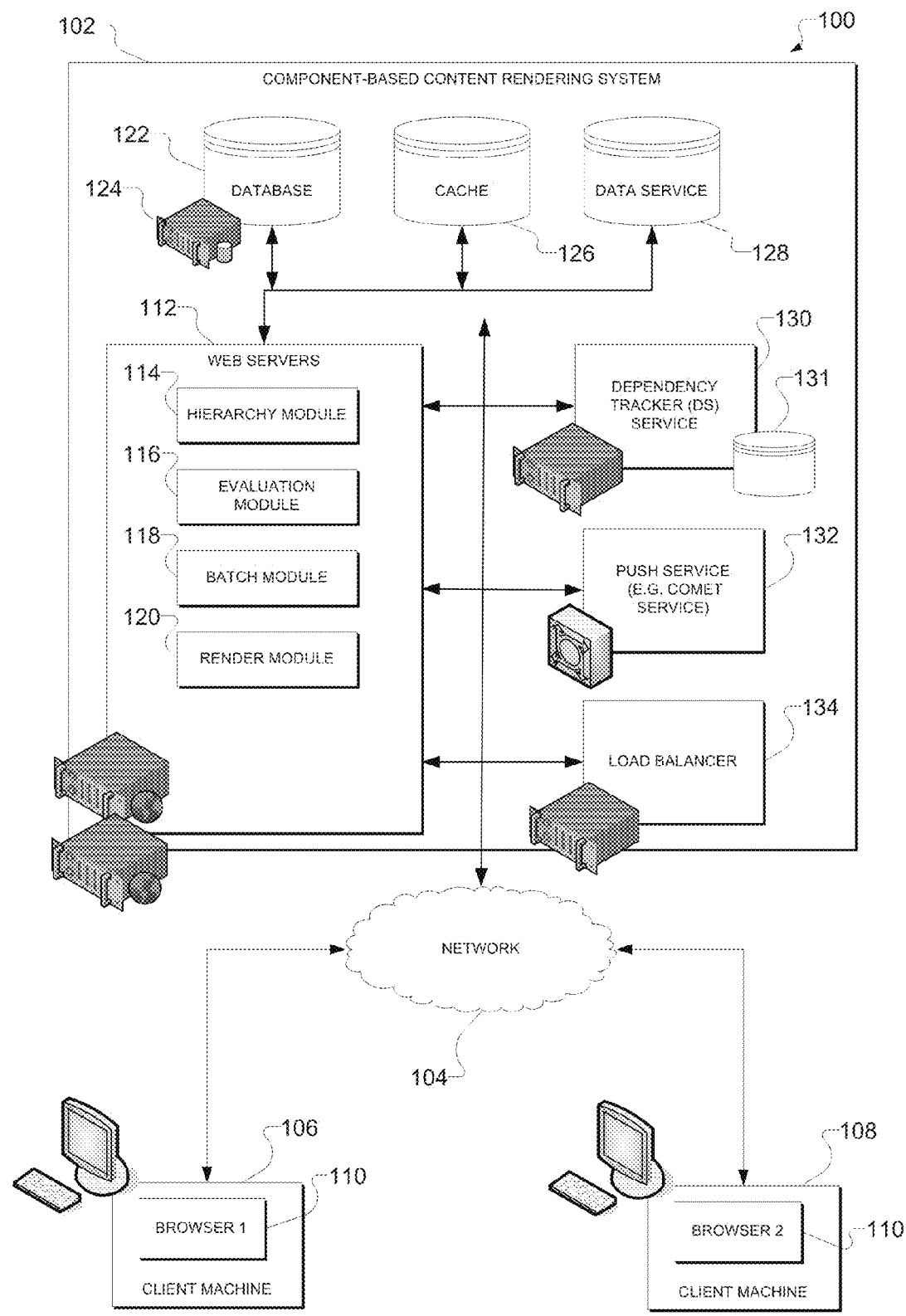
FIG. 1 is a block diagram illustrating a network environment which a component-based content rendering a system, according to some example embodiments, may be deployed.

FIG. 1 is a diagrammatic representation of a network environment 100 within which a component-based content rendering system 102, according to an example embodiment, may be deployed. The rendering system 102 may support a website that is accessible via a network 104 by multiple client machines (e.g., client machines 106 and 108), as well as other server machines (not shown). The rendering system 102 may operate to generate and dynamically update web content (e.g., documents in the form of HTML pages, a scripting language and Cascading Style Sheets (CSS)) that is delivered to respective browser applications 110 hosted and operating on client machines 106, 108, for presentation to a user.

Figure 2:
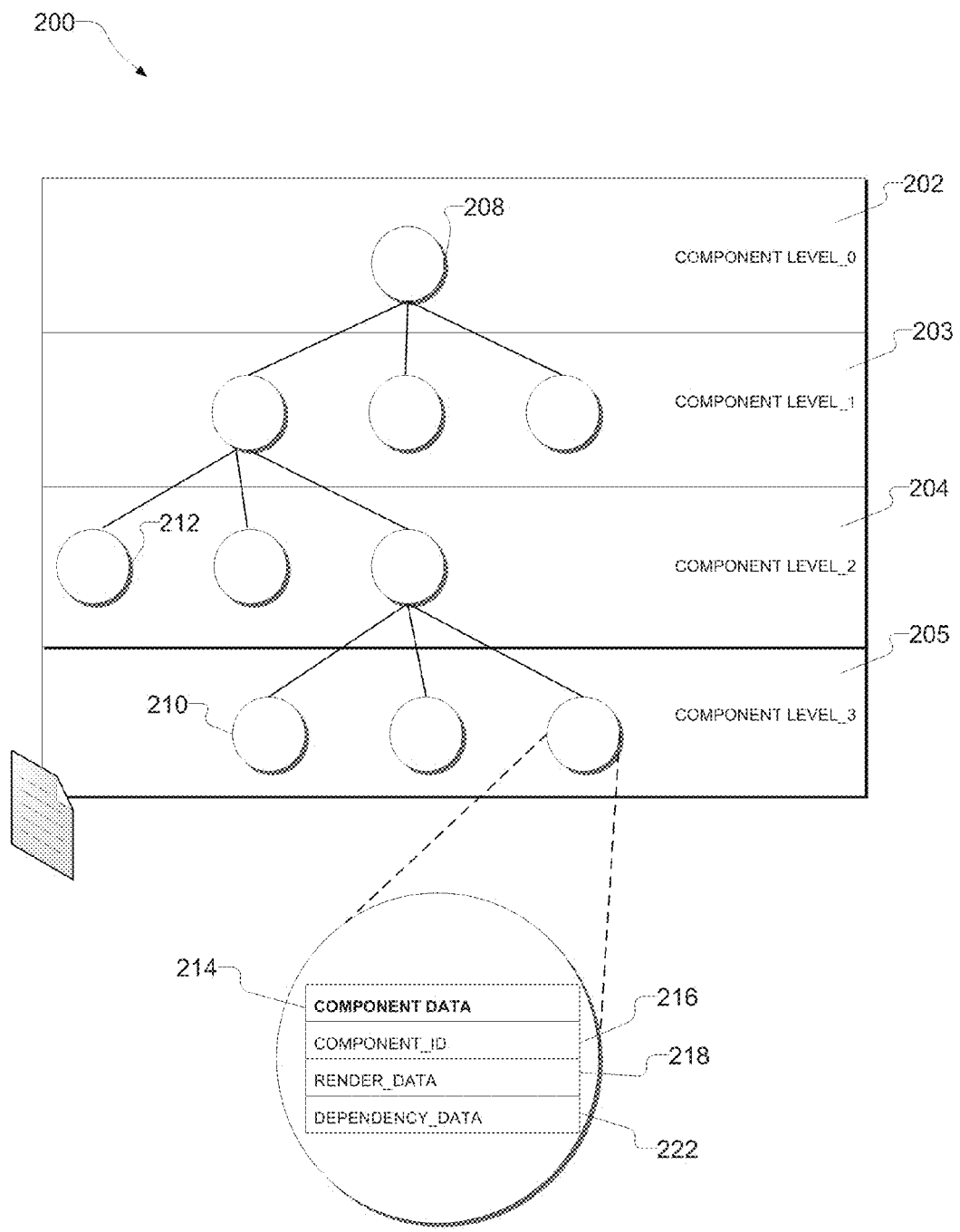
FIG. 2 is a tree diagram illustrating a component hierarchy, according to some embodiments, that may be computed by a hierarchy module of a web server.

The component-based content rendering system 102 is shown to include a number of web servers 112, which individually or cumulatively incorporate a number of modules or components. While the functionality of these components will be described in detail with reference to subsequent figures, a brief description of these components is provided at this juncture. A hierarchy module 114 operates to compute and generate a component hierarchy (e.g., such as shown in FIG. 2) that is used to render web content (e.g., HTML, a scripting language, CSS etc.). An evaluation module 116 operates to evaluate component seta of components from within a component hierarchy as part of a "prime and render" process. A batch module 118 operatively batches requests for data needed for the rendering of a particular component set. The batch requests issued by the batch module 118 are directed towards one or more data sources, which are separate from but accessible by the web servers 112. Such data sources may include one or more databases 122 having associated database servers 124, one or more caches 126 and external data sources 128 (e.g., a search service or a distributed storage system). The data sources may be accessible using Remote Procedure Call (RPC) protocols.

The web servers 112 further include one or more render modules 120 which operatively render web content (e.g., HTML) based on data retrieved responsive to data requests issued from the batch module 118.

The rendering system 102 further includes a dependency tracker 130 that maintains a record of a component hierarchy (e.g., a list of components and their dependencies) for each webpage that is served to a window of a web browser 110. It should be noted that a particular web server 112 may maintain a number of open windows at any one time, each of the windows rendering and displaying a respective webpage. The dependency tracker 130, in some example embodiments, maintains a component hierarchy for each of these windows. The dependency tracker 130 may thus need to store component hierarchies for a large number (e.g., thousands) of windows at any one time.

The rendering system 102 also includes an update server in the example form of a push service 132 (e.g., a Comet service) that operatively allows the web servers 112 to push data to the browsers 110, without the browsers 110 explicitly requesting such data. In order to push data from the push service 132 to a browser 110, the push service 132 may operatively maintaining state between an active window of a browser and the push service 132, so that the push service 132 is aware of the status (e.g., open or closed) of the active window and is able to push data and instructions to the active window. To this end, the push service 132 may use so-called "long-held" or hanging HTTP requests. In alternative embodiments, other non-polling HTTP communication technologies may be deployed by the push service 132. For example, HTML5 supports server-sent events and DOM event streaming. The HTML5 Web Sockets API supports a method of creating a persistent connection with a server and receiving messages via an "on message" callback. The Bayeux protocol allows for the establishment of browser-specific transports, and defines a higher-level protocol for communication between a browser and a server. The Bidirectional-streams Over Synchronous HTTP (BOSH) protocol may be used, and emulates bidirectional streaming between a browser and server by using two synchronous HTTP connections. Further, plug-ins (e.g. JAVA APPLETS or ADOBE FLASH) may be used to supports a push service from the rendering system 102 to a browser.

The rendering system 102 also includes one or more load balancers 134 that operatively receive HTTP requests from web browsers 110, and load balance these requests between the multiple web servers 112. In one example embodiment, the load balancers 134 may assist with the maintenance of data within one or more caches 126.

FIG. 2 is a tree diagram illustrating a generic component hierarchy 200, according to an example embodiment, that may be computed by the hierarchy module 114. The component hierarchy 200 is composed of a number of component nodes or elements which reside at different hierarchy levels. Dependencies are defined between components on different hierarchical levels. The example component hierarchy 200 is shown to include four component levels 202-205, and to have a root node component 208. The component hierarchy 200 also includes a number of leaf node components (e.g. 210 and 212) which may reside on different levels.

Each component may include component data 214 such as, for example, a component identifier 216, a render data identifier 218 that is requested by the component in order for the component to be rendered, and dependency data 222 identifying any further components which may be dependent upon the relevant component within the context of the component hierarchy 200. In one example embodiment, the component hierarchy 200 may be implemented using HTML DOM. In an alternative, Simple API for XML (SAX) may be used to define the component hierarchy 200.

Figure 3:
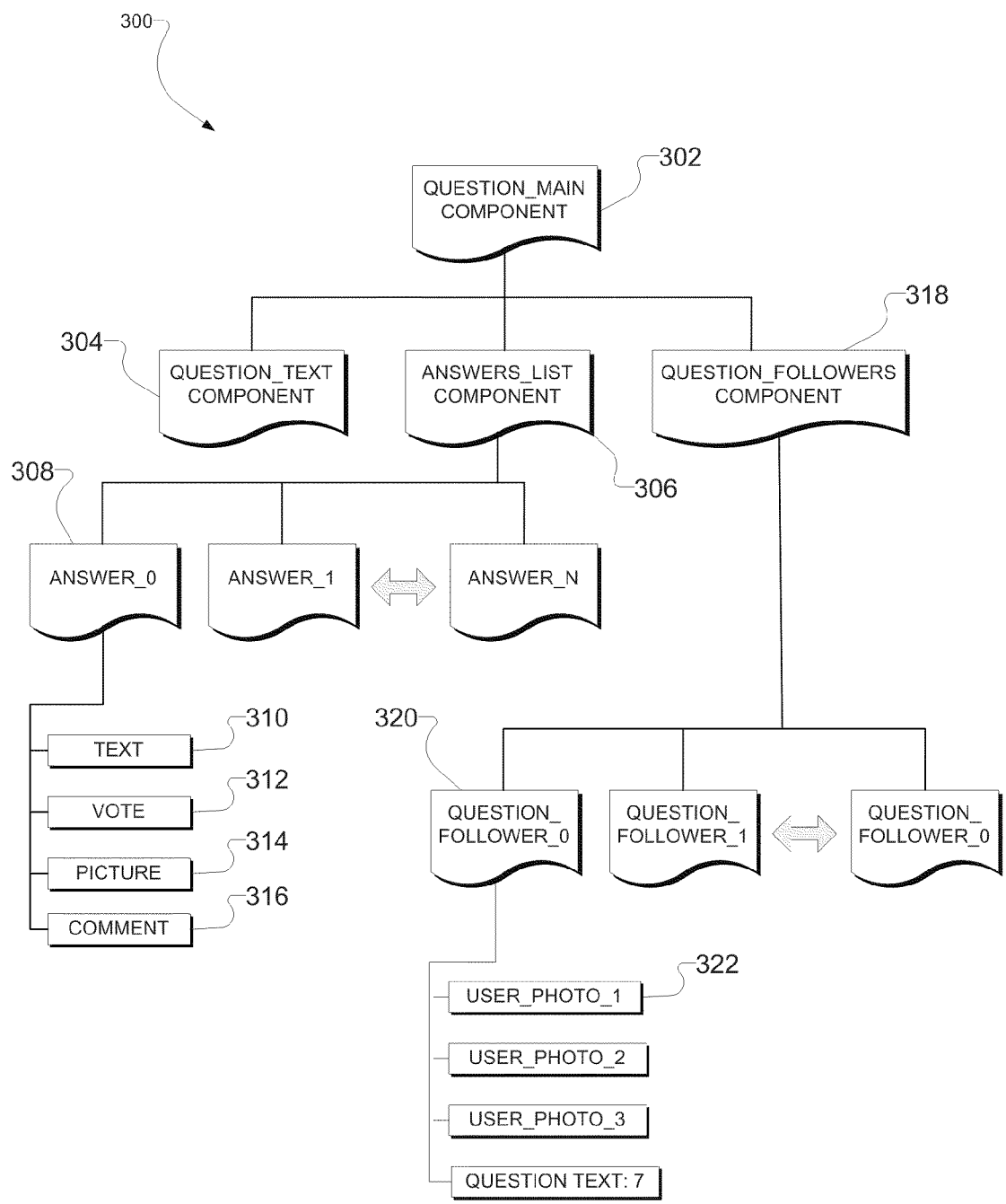
FIG. 3 is a tree diagram illustrating a component hierarchy of a question-answer webpage, according to some example embodiments, that may be generated by a hierarchy module.
Figure 4:
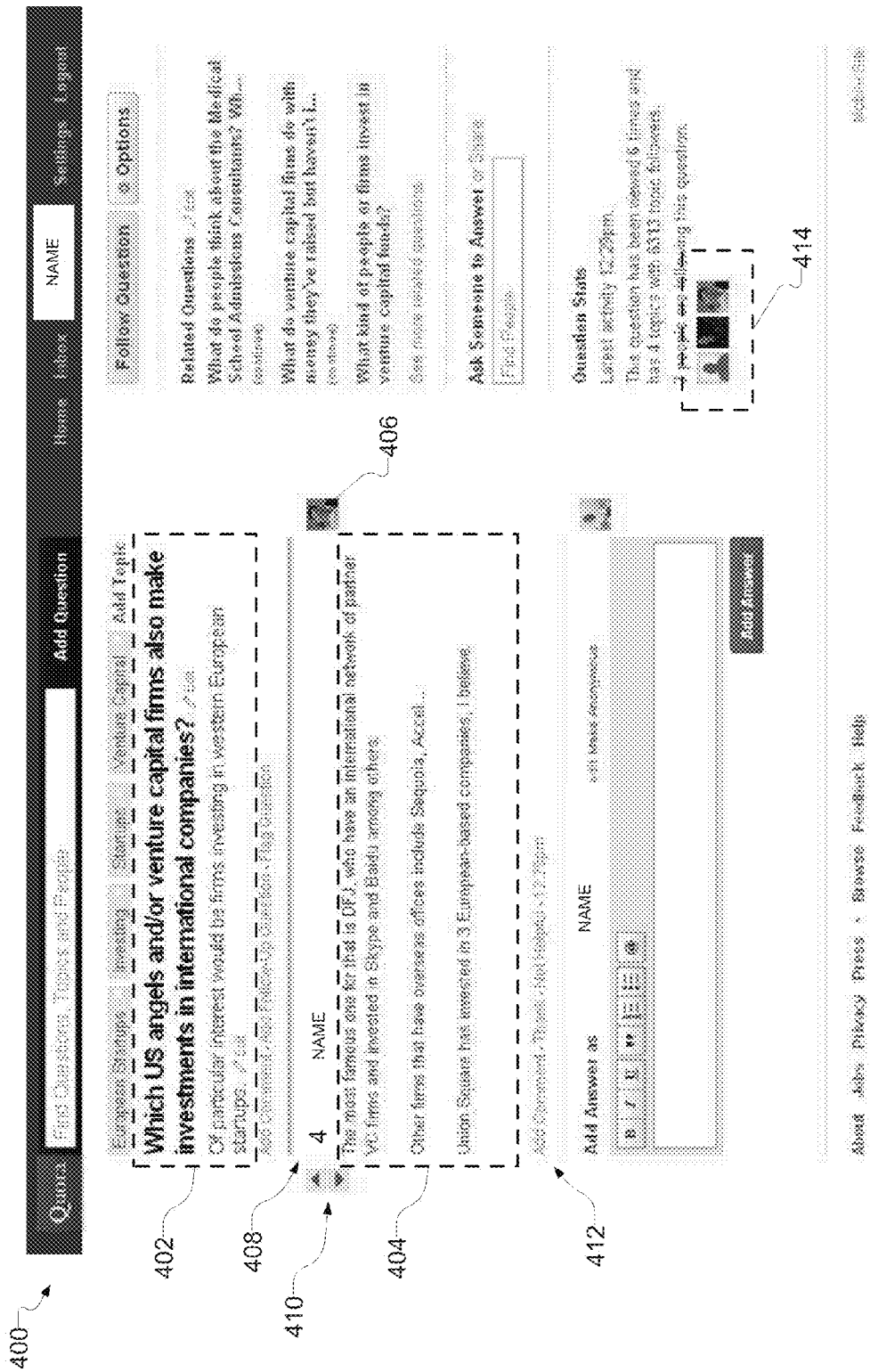
FIG. 4 is a screenshot of a question-answer webpage, according to an example embodiment, that may be generated based on the component hierarchy shown in FIG. 3.

As noted, a component hierarchy 200 may, in one example embodiment, represent a webpage with the various components of the component hierarchy 200 corresponding to components of a webpage. FIG. 3 is a tree diagram illustrating an example component hierarchy 300 corresponding to a question-answer webpage 400, shown in FIG. 4. The webpage 400 of FIG. 4 is provided merely as an example, and represents a webpage that may be delivered by a question and answer website, which allows users to post questions relating to various topics, and also to post answers to such questions.

The webpage component hierarchy 300 includes a root node, in the form of a question_main component 302, on which are dependent a question_text component 304, and answers_list component 306 and a question_followers component 318. The question_text component 304 identifies text expressing a question which is the subject of the page (e.g., the text 402 of the webpage 400). The text 402, in one example embodiment, may be identified within the database 122 by a render data identifier 218 that forms part of the question_text component 304.

The answers_list component 306 may include dependency data 222 that references a number of dependent answer components 308. Each of the answer components 308, with appropriate render data identifiers 218, may identify text data 310, vote count data 312, picture data 314, and comment data 316 for a particular answer, as stored within the database 122. Referring again to the webpage 400 as an example, the question expressed in the text 402 has a single answer, the text of which is identified at 404. The answer text 404 is also displayed in association with a picture 406 of a user that submitted the answer. A vote count for the respective answer is displayed at 408 alongside controls 410 using which the vote count can be incremented or decremented. While the answer shown in FIG. 4 does not have any associated comments, a user is presented with this option via the "add comment" link 412.

Returning to FIG. 3, the question_followers component 318 has a number of question_follower components 320 dependent thereon, each question_follower component 320 representing a user of the question-answer website that is following the relevant question. Data that may be requested by a particular question_follower component 320 (e.g., as identified by the render data identifiers 218) for rendering may include user photographs 322. These user photographs may be displayed within the context of the webpage 400, as illustrated at 414.

Figure 5:
FIG. 5 is a table diagram illustrating tables, according to an example embodiment, which may be maintained within a dependency tracker shown in FIG. 1.

FIG. 5 is a table diagram illustrating example tables 500 that may be maintained by the dependency tracker 130 in order to track the dependencies of various components that have been included in webpages delivered to active windows of browsers 110 by the rendering system 102. The illustrated tables 500 include, merely for example, a window table 502 storing data for a particular webpage delivered to a specific window, and a dependency table 504 storing information regarding dependencies between components of a component hierarchy for a particular window.

Within the window table 502, for each window, is stored a window identifier 506, a window status 508, and component identifiers for various components that are included within the relevant webpage delivered to the specific window. The window status 506, in one example embodiment, may indicate whether a window is active (e.g., still open within the context of a browser 110) or has been closed (e.g., is inactive). The window status 506 may in turn be determined by the push service 132, which receives a notification from a webpage when a host window is closed. The push service 132 may, in this case, update the window status 508.

The dependency table 504 stores, for each component, a component identifier 512, as well as component identifiers 514 of all child components of that component. The tables 502 and 504 may be stored within a database 131 associated with the dependency tracker 130.

Figure 6:
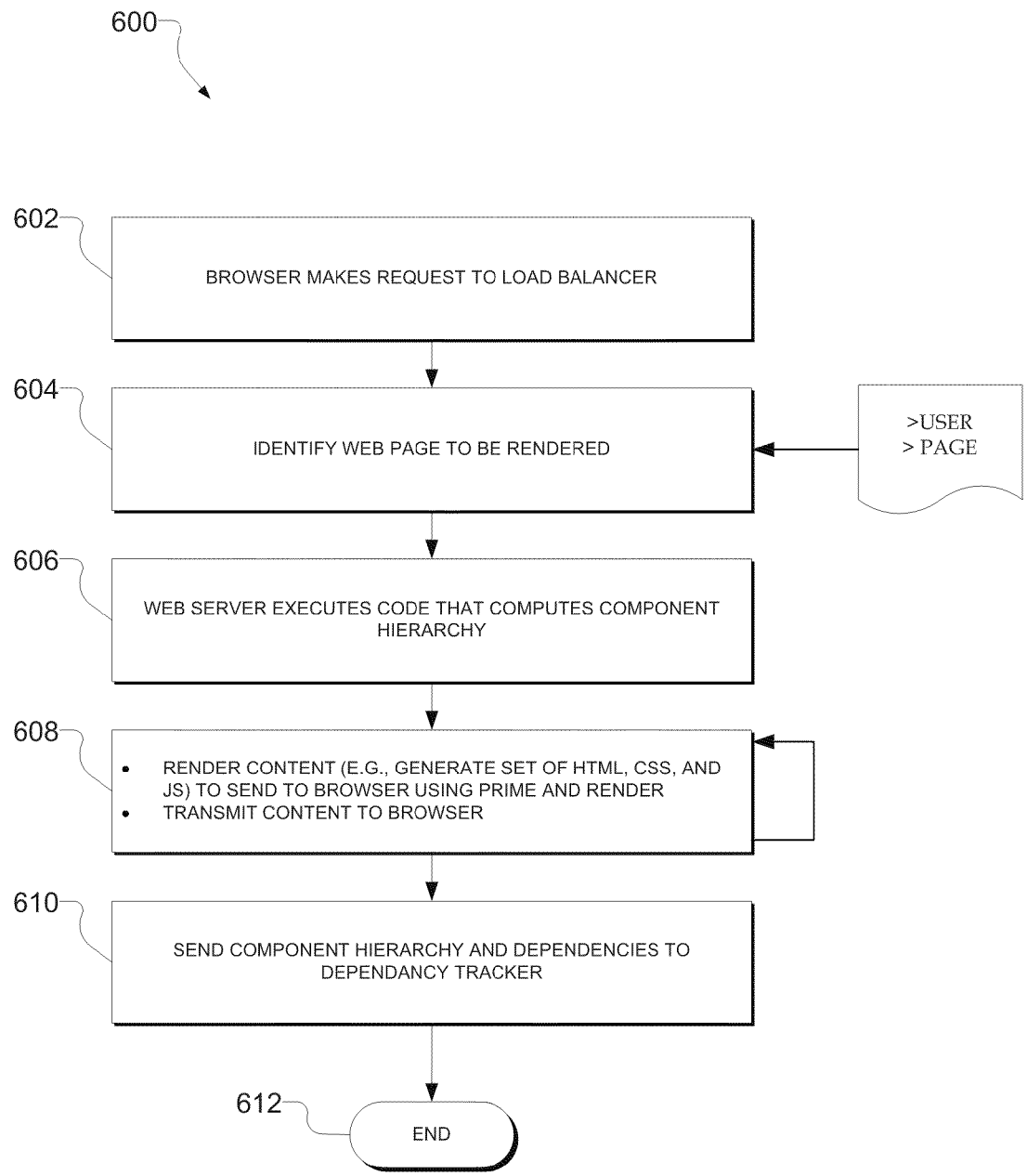
FIG. 6 is flowchart illustrating a method, according to an example embodiment, to generate web content in the example form of HTML, CSS and a scripting language that is communicated from a web server to a web browser for display within the context of the web browser.

FIG. 6 is a flowchart illustrating a method 600, according to an example embodiment, to render content, in the example form of a webpage. The method 600, in one example embodiment, is performed by the render module 120 of a web server 112 of FIG. 1. The method 600 commences at operation 602 with a browser 110, hosted on a client machine 106, making a request, via the network 104 to the rendering system 102 for a webpage. The request may be in the example form of a Uniform Resource Locator (URL) that identifies a specific webpage. The request, when received at the content rendering system 102, is directed to a load balancer 134 that then redirects the request to an appropriate web server 112 that is best able to respond to the request. Load balancing may, for example, be performed based on real-time loads across the collection of web servers 112, or alternatively based on an allocation of duties across the connection of web servers 112.

At operation 604, the web server 112 identifies a webpage to be rendered. This identification of an appropriate webpage may be based upon the URL, as well as other information such as a user identifier, included with the request. For example, the webpage may require customization based on the identity of the user from which the request originated. Other factors (e.g., geographic location, etc.) may also be taken into account in identifying (or specifying) the relevant webpage to be rendered.

At operation 606, the relevant web server 112 executes code (e.g., the hierarchy module 114) that computes the component hierarchy for the relevant page. The computation of the component hierarchy may, one example embodiment, include identifying data objects or components (e.g., content items) that are to be included in the web page. For example, the various data object sand components to be included in the customised the web page identified at operation 604 may be identified, and a hierarchy of relationships between these data object and components may be determined based on data structures (e.g., relational tables) maintained within the database 122. The data object and components to be included in the web page may be dependent upon the type of information requested by a user, an identity of the user, and other demographic and geographic information relating to the user.

At operation 608, the web server 112 generates content based on the computed component hierarchy using a prime and render algorithm, which is more fully described below with reference to FIG. 8. In one example embodiment, the content that is generated at operation 608 may be a set of HTML code, CSS and a scripting language that is sent to the browser to be rendered as a webpage. The generation of the content at operation 608 may, in one example embodiment, be performed by the evaluation module 116, the batch module 118, and the render module 120. Further, at operation 608, the web server 112 then transmits the generated content, via the network 104, to the browser 1108 hosted on the client machine 102.

At operation 610, the web server 112 sends the component hierarchy, generated at operation 606, and associated dependencies to the dependency tracker 130 for storage and subsequent access in a content update method, which is described more fully below with reference to FIG. 10. The method 600 then terminates at operation 612.

Figure 7:
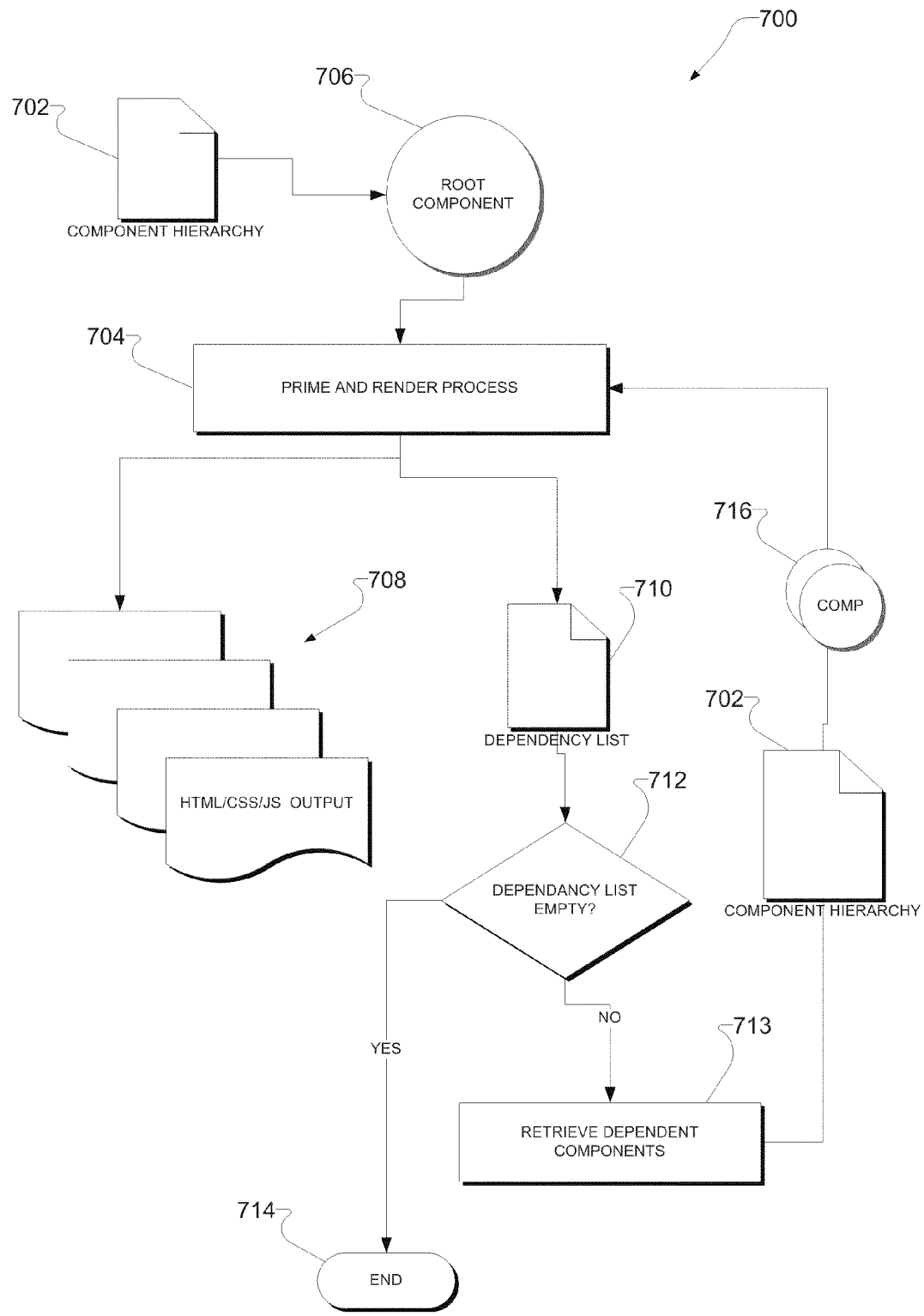
FIG. 7 is a process diagram illustrating a process, according to example embodiment, to generate a webpage using a "prime and render" process, according to an example embodiment.

FIG. 7 is a process diagram illustrating a process 700, according to an example embodiment, to generate content. The process 700, as shown in FIG. 7, illustrates how various component sets are extracted from a component hierarchy based on depth within the component hierarchy (e.g., distance from a root node), and inputted to a prime and render process 704. The prime and render process 704 in turn generates content for each extracted component set in order to create a collection of content 708 that collectively constitutes the content (e.g., webpage) communicated to a browser.

Initially, a root component 706 is extracted from the component hierarchy and inputted to the prime and render process which, as described above, generates content in the example form of HTML, CSS and a scripting language 708. A second output of the prime and render process 704, based on the root component 706 input is a dependency list 710 that identifies components dependent upon the one or more components (e.g., in this case the root component 706) that were input to the prime and render process 704. As will be described in further detail with reference to FIG. 8, the components listed in the dependency list 710 need not be directly dependent upon the one or more components that were inputted to the prime and render process.

At decision operation 712, a determination is made as to whether the dependency list 710 is empty (e.g., there are no further components that need to be evaluated by the prime and render process 704). If so, this indicates that all components of the status 508 702 have been evaluated and rendered, and the process terminates at 714.

Alternatively, if the dependency list 710 is determined at operation 712 not to be empty, components 716 identified therein are extracted from the component hierarchy 702 at operation 713, and provided as input to the prime and render process 704. The process 700 iterates through operations 704 and 712, until all components within the relevant component hierarchy 702 have been evaluated and rendered, and all generated content 708 for the component hierarchy has been generated.

Figure 8:
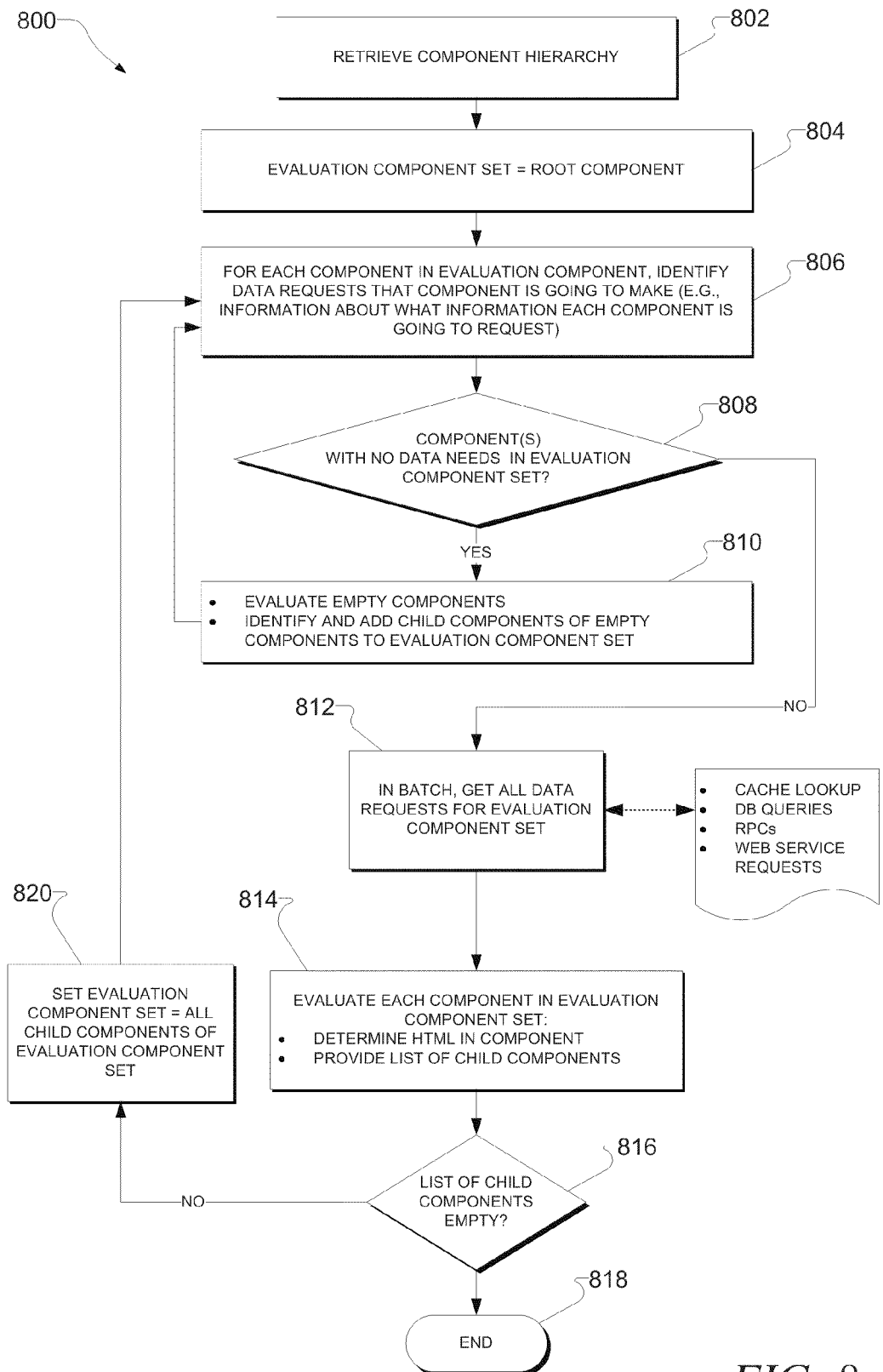
FIG. 8 is flowchart illustrating a method, according to some example embodiments, to fetch data for a component (e.g., prime) and render a component set from a component hierarchy.

FIG. 8 is a flowchart illustrating a method 800, according to an example embodiment, to retrieve data requested by a component (e.g., prime a component) and render the component of a component hierarchy, such as the component hierarchy shown in FIG. 2.

The method 800 commences with the retrieval of a component hierarchy at operation 802. The component hierarchy may either be computed, as in the case of rendering a new webpage, or retrieved from the dependency tracker 130 in the case of updating a webpage (described below with FIG. 10). The retrieval of the component hierarchy may be performed by the hierarchy module 114 of a web server 112.

At operation 804, an evaluation module 116, tasked with evaluating the component hierarchy, establishes an initial evaluation component set to comprise the root component 706 of the component hierarchy 702.

At operation 806, the evaluation module 116 of the web server 112 identifies, for each component in the evaluation component set, data requests that the component is going to make. For example, the evaluation module 116 may parse each component in the evaluation component set to establish render data identifiers 218 (see FIG. 2) for the respective component.

At decision operation 808, the evaluation module 116 determines whether a particular component of the evaluation component set does not include a data request for a data item. For example, a particular component may be evaluated to include no render data identifiers 218, or otherwise not require that data be retrieved from any data sources in order to render the relevant component.

At operation 810, responsive to determining that a particular component does not require data (e.g., does not include any data requests), the relevant component is evaluated as empty component.

Further, all child components of the empty component, as specified in terms of the component hierarchy, are then added to the evaluation component set. The method 800 then loops back to operation 806, and the newly added components are then evaluated at operations 806 and 808 to determine whether any of the newly added components do not require data in order to be rendered. The method 800 iterates through operations 806, 808 and 810 until either all of the components in the evaluation component set include a data request, or alternatively constitute an empty leaf component of the component hierarchy.

Following a determination at decision operation 808 that there are no components within the evaluation component set that do not include data requests, the method 800 progresses to operation 812, where the batch module 118 identifies data items that are the subject of the data requests in the evaluation component set, and proceeds to retrieve the data items as a batch from relevant data sources (e.g., the database 122, the cache 126 or a data service 128). The batching of the data request at operation 812 for an evaluation component set may include sending a single request for all required data items to each of a number of the data sources. For example, a single request for all data items required by the evaluation component set may be sent to the database 122. Similarly, a single request for data items within the cache 126 and a further single request for the data service 128 may be sent. Alternatively, a single data request may be published (e.g., using a published-subscribe model) to all of the data sources, with the respective data sources responding with information to which they have access. In this case, where a requested data item is stored within the cache 126, this may be returned from that resource, as opposed to the database 122, in view of a quicker response time from the cache 126.

At operation 814, the evaluation module 116 may perform a further evaluation on each component in the evaluation set to determine structural or formatting data (e.g., HTML data) for the component, and also to extract a list of child components, for example as specified by the dependency data 222 of the various components and reflected in the component hierarchy 702.

At decision operation 816, a determination is made as to whether the list of child components, extracted from the evaluation component set at operation 814, is empty. If so, this indicates that all components within the relevant status 508 have been evaluated, and the necessary data items requested at operation 812. In this case, the method 800 then terminates at operation 818.

On the other hand, should the list of child components be empty, a new evaluation component set is established at operation 820. Specifically, the child components, identified in the list of child components extracted from the previous evaluation component set, are established as the current evaluation component set at operation 820. The method 800 then loops back to operation 806, and continues to iterate through operations 806-816 until it has stepped down through successive evaluation component sets until all components, of a component hierarchy, that include data requests have been evaluated.

Figure 9:
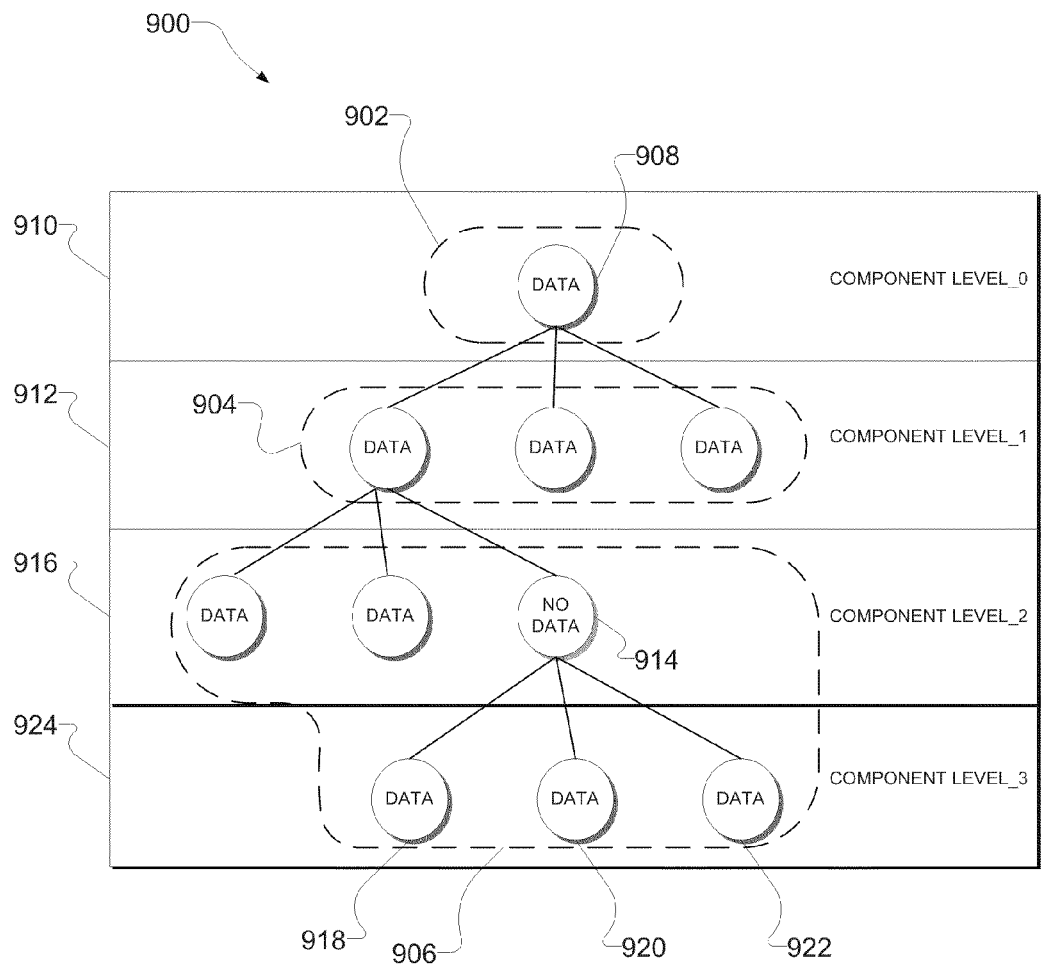
FIG. 9 is a tree diagram, according to an example embodiment, showing different component sets within a component hierarchy.

FIG. 9 is a tree diagram illustrating a component hierarchy 900, with respective evaluation component sets, evaluated during respective iteration of the operations 806-816, identified at 902, 904 and 906. An initial evaluation component set 902 includes only a root component 908, at a first hierarchical level 910 of the component hierarchy. A second evaluation component set 904 constitutes components on a second level 912 of the component hierarchy. It will be noted that each of the components in the first two hierarchical component levels 910 and 912 include data requests.

Moving onto the third evaluation component set 906, one of the components 914 of the components on a third level 916 of the component hierarchy 900 does not require any data to support rendering (e.g., does not include any data requests). For this reason, the third component set 906 is expanded (at operation 810 of the method 800) to include the child components 918, 920 and 922 of the "empty" component 914. Accordingly, the third evaluation set 906 straddles both the third hierarchical component level 916 and a fourth hierarchical component level 924. Further, in the event that any of the child components 918, 920 or 922 were evaluated to be "empty", the third component set 906 would have been expanded to include any child components of the relevant "empty" component.

In summary, it will be appreciated that the prime and render method 800, discussed above with reference to FIGS. 8 and 9, seeks to step down a component hierarchy, from a root component, and batch requests for data items required by components on each level of the component hierarchy, with the exception that, in the event a particular hierarchical level includes an "empty" component, child components of the empty component may be included in a current component set for which data item requests are batched.

The batching of request for data items required by components of a component hierarchy may, in some example embodiments, provide performance advantages in that the eventual rendering of content based on the component hierarchy may be expedited as a result of a fewer number of requests being issued to data resources than would be the case if individual data requests were sent for each component. Further, the batching of data requests results in less demands being placed on resources, as these resources may be required to respond to a fewer number of requests than would otherwise have been the case. A further technical advantage that may be realized, in some example embodiments, is that traffic on buses within the rendering system 102 may be reduced as a result of a fewer number of overall requests being issued from the web servers 112 to data resources.

Figure 10:
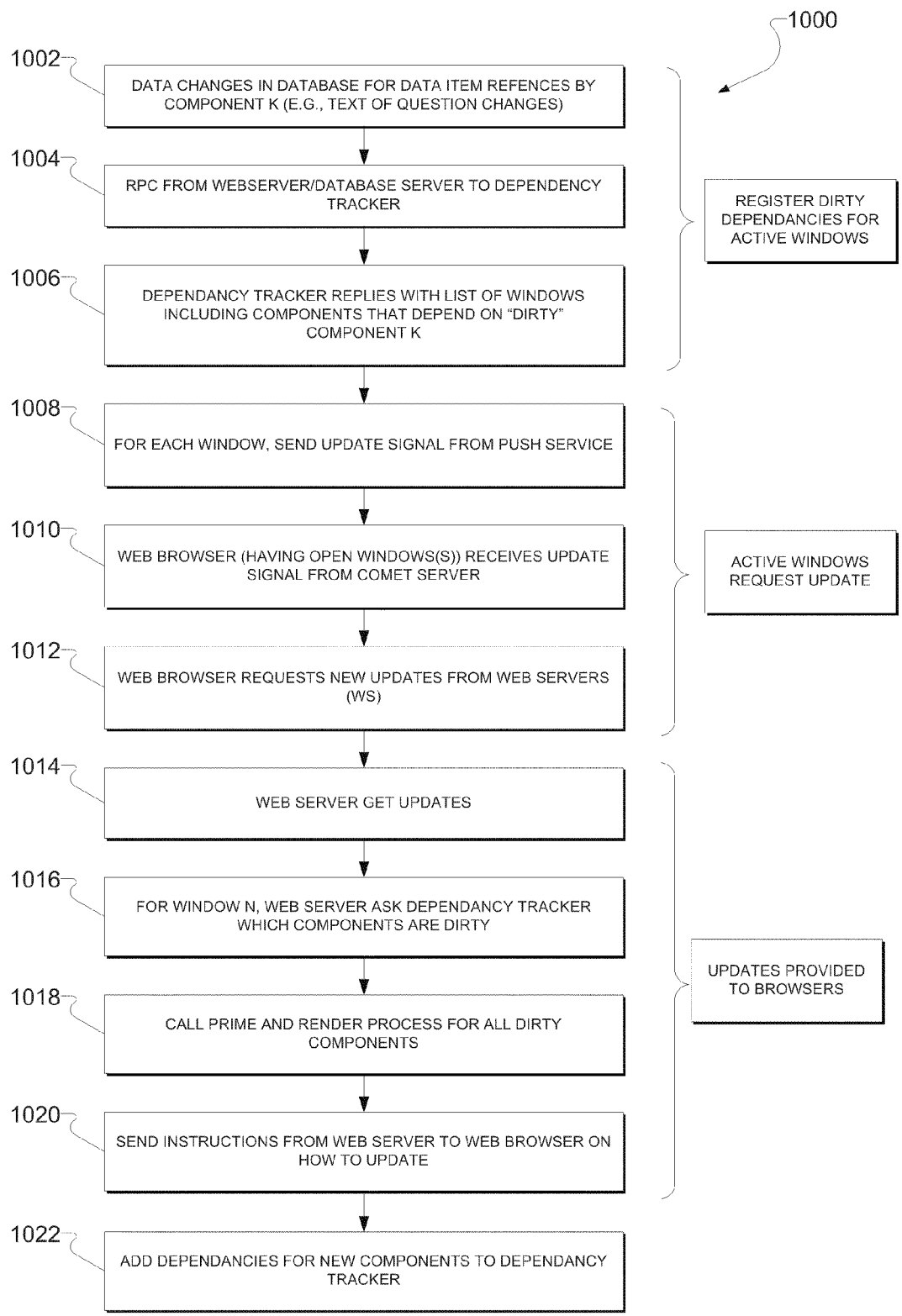
FIG. 10 is a flowchart illustrating a method, according to an example embodiment, to update web content based on one or more changes to underlying data that is incorporated within the web content.

FIG. 10 is a flowchart illustrating a method 1000, according to an example embodiment, to update content (e.g., a document in the example form of a webpage) that has been served from a web server to a client machine for display within the context of an application (e.g., a browser hosted and executing on the client machine.

The method 1000 commences at operation 1002 with detecting a change in a database 122 with respect to a data item that is referenced (e.g., by a render data identifier 218) of a component K. For example, considering the component hierarchy 300 discussed above with reference to FIG. 3, the text of a question referenced by question_text component 304 may have been changed by a user that posed the question, or by a moderator user of a question-answer website. In one example embodiment, where the web server 112 makes the change with respect to the data item in the database 122 (e.g., a user, through the web server 112 updates information), the change is detected by the web server 112. In a further embodiment, the change with respect to the data item may be detected by the database server 124, either as a as a result of a change made by the web server 112, or a change made by a different component, internal or external to the rendering system 102.

At operation 1004, information identifying the relevant data item is communicated to the dependency tracker 130. In one example embodiment, the web server 112 that initiated the change with respect to date item may make a Remote Procedure Call (RPC) to the dependency tracker 130. In a different example embodiment, the database server 124 may make the RPC called to the dependency tracker 130.

In one example embodiment, the cache 126 may be logically placed "in front" of the database 122, so that the cache 126 first tries to satisfy a data request and, if unable to do so, passes the request on to the database 122. For this reason, in one example embodiment, responsive to detecting a change in a data item within the database 122, a web server 112 or the database server 124 may pre-fill the cache 126 with an updated data item prior to issuing an RPC to the dependency tracker 130 (at operation 1004) to advise the dependency tracker 130 of the impacted data item.

At operation 1006, the dependency tracker 130 identifies a set of components that are impacted by the change relating to the relevant data item within the database 122. Specifically, the dependency tracker 130 may identify a first set of invalid or "dirty" components that are directly impacted by the change relating to the data item. For the purposes of the current specification, the term "dirty" component or "dirty" data shall be taken to indicate a potentially invalid component or data item, a data whose integrity may have been compromised or data that may have become out of date or not current. Such directly impacted components may be recognized by the dependency tracker 130 as directly referencing the changed data item (e.g., directly identifying the changed data item with a render data identifier 218).

At a second operation, the dependency tracker 130 identifies a second set of "dirty" components that depend upon the first, directly impacted set of "dirty" components, using the list of component dependencies maintained by the dependency tracker 130 (e.g., by referencing the dependent_component identifiers 514 stored within the dependency table 504 maintained by the dependency tracker 130).

Further, at operation 1006, the dependency tracker 130 then identifies a set of webpages (e.g., delivered to windows of browsers 110 for which the window status 508 is active) that include components within the first and second sets (e.g., so-called "dirty" components). Further, still at operation 1006, the dependency tracker 130 may provide a list of windows including "dirty" components to the push service 132. Accordingly, the various operations 102-106 may be regarded, in one example embodiment, as collectively registering "dirty" dependencies for webpages displayed in active windows of browsers 110 hosted on remote client machines.

Moving on to operation 1008, the push service 132 initiates an update operation with respect to webpages in active windows of browsers 110. The push service 132 specifically sends an update signal to each of the active windows, requesting each of the active windows to request updates from a web server 112.

In one embodiment, the update signals sent from the push service 132 to the browsers 110 at operation 1008 may be staggered in time, so as to stagger the responsive browser requests for new updates (at operation 1012) back to the web server 112. In a further embodiment, the update signals may include delay information to delay some of the requests from the web browsers back to the web servers 112 by a range of intervals, so as to stagger the receipt of the update requests from the web browsers 110 at operation 1012. Regardless of how the staggering is achieved, it will be appreciated that the staggering of the update requests may flatten or reduce demand peaks on the web servers 112 that need to be accommodated by the load balancer 134.

In an alternative embodiment, as opposed to having the push service 132 merely send update signals to the respective browsers, the instructions sent at operation 1020 may be pre-computed and included in a direct update request "pushed" using the push service 132 directly to the browsers 110. In this embodiment, the round trip operation, whereby a browser sends an update request to the web server 112, may be eliminated.

At operation 1010, each of the web browsers 110, having active windows displaying rendered content from the rendering system 102, receives an update signal from the push service 132, advising the web browser 110 to seek updates from appropriate web server 112.

At operation 1012, each of the web browsers 110 requests new updates, via the network 104, from the web servers 112. As with requests for page generation, requests for updates may be received at load balancer 134, and distributed to one or more web servers 112 according to load balancing protocols and algorithms deployed by the load balancer 134.

At operation 1014, responsive to the initiation of the update operation by the push service 132 at operation 1008, a web server 112 receives an update request from a remote browser 110, the request being to update a particular webpage. The update request issued by the web browser 11, at operation 1012 may identify a webpage using a URL. In addition, the update request may include other identifying information (e.g., user or geographic identification information) that is used by the relevant web server 112 at operation 1014 to identify the particular webpage to which the update request applies.

At operation 1016, the appropriate web server 112 issues a request to the dependency tracker 130 to identify components, included within the particular webpage to which the updated request applies, that are "dirty" (e.g., directly impacted by the change to the data item in the database, or dependent upon a component so directly impacted).

Responsive to the request at operation 106, the dependency tracker 130 returns, to the web server 112, a list of "dirty" components.

At operation 1018, the web server 110 initiates the prime and render process, an example of which is discussed above with reference to FIG. 8, with respect to the list of "dirty" components. Specifically, the evaluation module 116, and the batch module 118 may be deployed to evaluate a list of "dirty" components, and to batch requests for updates to data requested by such components.

Having requested updated information for all "dirty" components, and having identified components which may have been added and removed from within the "dirty" components, at operation 1020, the web server 112 provides instructions to the remote browsers 110 to update the "dirty" components of a particular webpage. The instructions that are sent by the web server 112 to a particular browser 110 may include the following:

- A set instruction, to set data (e.g., a variable value, text etc.) for an impacted component.
- An add instruction, to insert a dependent component that is dependent upon an impacted component.
- A remove instruction, to delete an impacted component or a dependent component that is dependent upon an impacted component.
- A replace instruction, to replace an impacted component or a dependent component that is dependent upon an impacted component.

The update instructions are accompanied with appropriately rendered content (rendered during the prime and render process at operation 1018), so as to enable the browser 110 to update the respective webpages. In one example embodiment, the update instructions may include a DOM identifier, identifying an HTML element, with the set instruction identifying HTML element using the DOM identifier. A set instruction may also reference a scripting language, CSS and/or other related information.

At operation 1022, an updated dependencies, generated during the prime and render process operation 1018, for new components are added to the data maintained by the dependency tracker 130.

The prime and render process may be modified to take into account the deletion of certain components from the component hierarchy that may have resulted from the update detected within the database at operation 1002. To this end, for a particular webpage, a list of "dirty" (e.g., actually or potentially out-of-date or invalid) components may be sorted, and the components that are closest to a root of the component hierarchy are updated first. By first updating the components that are higher within the hierarchy (e.g., closer to the root), components that have deleted as a result of the update will automatically be skipped over during the prime and render process at operation 1018.

In some example embodiments, for every component, a fingerprint of the contents may be created (e.g., in the form of a hash). Prior to performing an update operation with respect to the component (e.g., by sending instructions from a web server 112 to web browser 110 at operation 1020), a hash of the updated component may be generated, and compared to the hash of the pre-update component. If the hashes match, then the updated instructions with respect to the particular component are not sent at operation 1020. For example, where a dependent component of a webpage is invalidated as a result of an update, it may be that the update does not effect rendering of the webpage because the dependent component is not included in a rendering of a webpage (e.g. because only a threshold number of components of the webpage are rendered). In the context of a question/answer page, a rendering of the page may be limited to a determinable number of answers. Where an update process is, for example, triggered by the addition of an answer that is exceeds the determinable number, a rendering of the question/answer page responsive to the update may result in an identical page to that rendered before the update operation. In his case, a comparison of hashes of the pre- and post-update question/answer pages would result in update instructions not being sent at operation 1020.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 11:
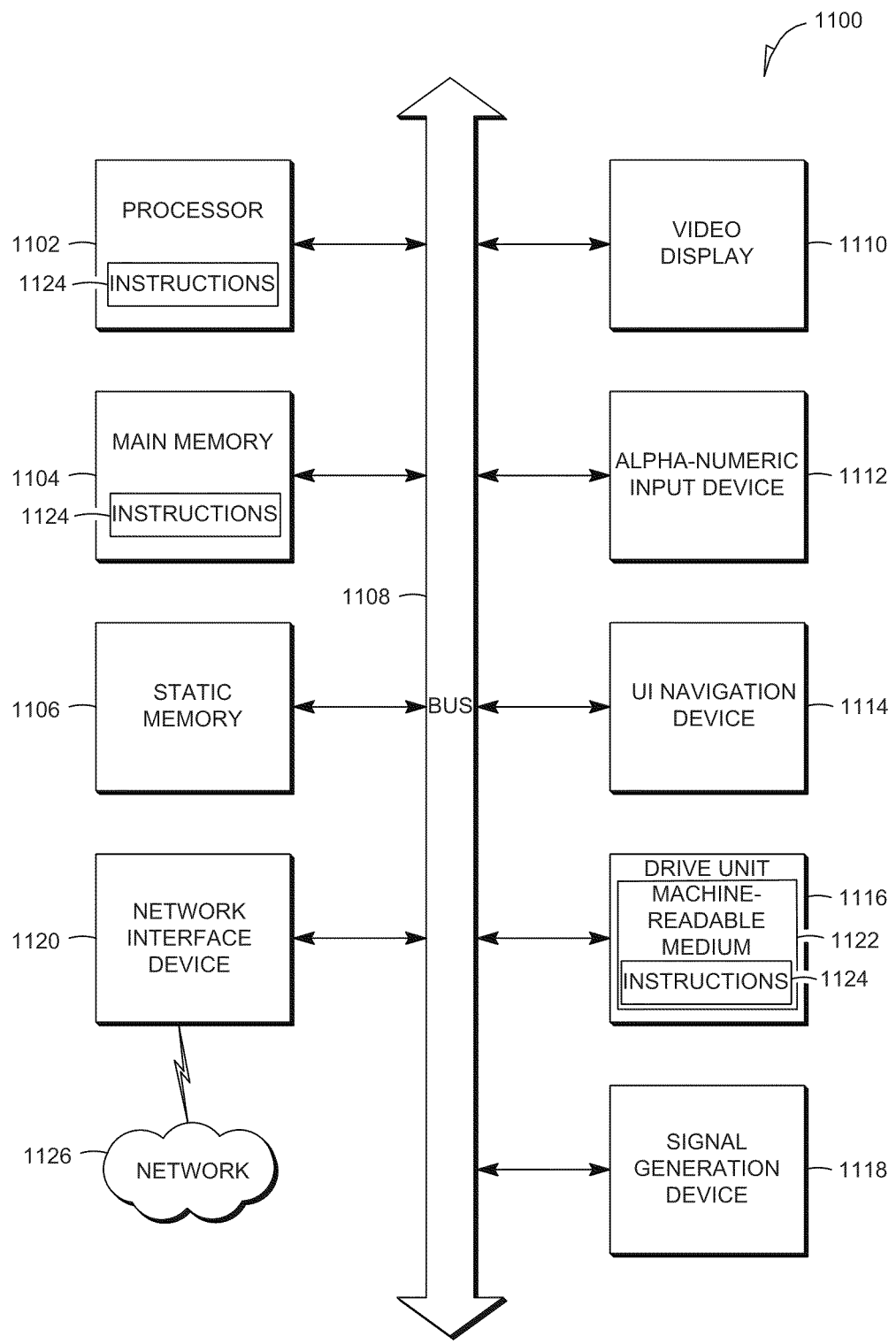
FIG. 11 is a block diagram of a machine, in the example form of a computer system, within which a set of instructions may be executed, in order to cause the machine to perform any one or more of the methods discussed herein.

FIG. 11 is a block diagram of machine in the example form of a computer system 1100 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a user interface (UI) navigation device 1114 (e.g., a mouse), a disk drive unit 1116, a signal generation device 1118 (e.g., a speaker) and a network interface device 1120.

Machine-Readable Medium

The disk drive unit 1116 includes a machine-readable medium 1122 on which is stored one or more sets of instructions and data structures (e.g., software) 1124 embodying or used by any one or more of the methodologies or functions described herein. The instructions 1124 may also reside, completely or at least partially, within the main memory 1104 and/or within the processor 1102 during execution thereof by the computer system 1100, the main memory 1104 and the processor 1102 also constituting machine-readable media.

While the machine-readable medium 1122 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
   a hierarchy hardware module configured to identify a component hierarchy of a plurality of components from which to render a webpage;
   an evaluation hardware module configured to select, as an evaluation component set, a subset of components from the plurality of components based on the component hierarchy and to evaluate the evaluation component set by:
      determining whether components of the evaluation component set include a data request for a data item, the data item including vote count data related to an answer to a question;
      determining that a particular component of the evaluation component set does not include a data request for a data item to be used in the rendering of the webpage;
      responsive to the determination that the particular component does not include the data request, identifying at least one child component of the particular component within the component hierarchy; and
      adding the at least one child component to the evaluation component set;
   a batch module configured to identify a plurality of data items that are the subject of respective data requests of the evaluation component set and to retrieve the plurality of data items as a batch from at least one data source; and
   a render module configured to cause a user interface to display at least some of the plurality of data items as retrieved from the at least one data source and the vote count data for at least one of the plurality of data items as retrieved.

2. The system of claim 1, wherein the evaluation hardware module is configured to select the set of components from the plurality of components based on the component hierarchy as an initial evaluation component set, and wherein the evaluation hardware module is configured to:
   iteratively determine whether components of the initial evaluation component set include respective data requests,
   add respective child components to the initial evaluation component set based on the respective determinations, until either all of the components of the initial evaluation component set:
      include a respective data request, or
      constitute a leaf component of the component hierarchy; and
   establish the initial evaluation component set as the evaluation component set.

3. The system of claim 1, wherein the batch module is configured to retrieve the plurality of data items from a plurality of data sources, the plurality of data sources including two or more of a database, a cache, and a web service.

4. The system of claim 3, wherein the batch module forms part of a web server, and wherein the at least one data source is separate from the web server.

5. The system of claim 1, comprising a render module configured to render content for the webpage using the plurality of data items retrieved as the batch.

6. The system of claim 5, wherein the evaluation module is configured to generate a list of dependencies between the components of the component hierarchy from which the webpage is rendered, the system further comprising a dependency of tracker configured to store the list of dependencies.

7. The system of claim 1, wherein the evaluation module is configured to determine that the component hierarchy includes at least one component not previously evaluated, and to select a further set of components from the component hierarchy as the evaluation component set.

8. The system of claim 1, wherein the evaluation module is configured to determine that all components of the component hierarchy have been evaluated, and the render module is configured to transmit the webpage, including the rendered content, to a client machine.

9. The system of claim 1, wherein the hierarchy module identifies the component hierarchy responsive to a client request for the webpage.

10. The system of claim 1, wherein the selection of the evaluation component set comprises selecting at least one component from a selected hierarchical level of the component hierarchy.

11. The system of claim 1, wherein the evaluation module is configured to select the evaluation component set by selecting at least one component within the component hierarchy not included in a previous evaluation component set, and closest to a root component of the component hierarchy.

12. The system of claim 1, wherein the data item further includes at least one of picture data and comment data.

13. A method comprising:
   identifying a component hierarchy of a plurality of components from which to render a webpage;
   selecting, as an evaluation component set, a subset of components from the plurality of components based on the component hierarchy; and
   evaluating the evaluation component set, the evaluating including:
      determining whether components of the evaluation component set include a data request for a data item, the data item including vote count data related to an answer to a question;
      determining that a particular component of the evaluation component set does not require data from a data source in order to be rendered;
      responsive to the determination that the particular component does not include the data request, identifying at least one child component of the particular component within the component hierarchy; and
      adding the at least one child component to the evaluation component set; and
   identifying a plurality of data items required in order to render a plurality of components of the evaluation component set;
   retrieving the plurality of data items as a batch from at least one data source; and
   causing a user interface to display at least some of the plurality of data items as retrieved from the at least one data source and the vote count data for at least one of the plurality of data items as retrieved.

14. The method of claim 13, wherein selecting the set of components from the plurality of components based on the component hierarchy selects an initial evaluation component set, and further comprising:
   iteratively determining whether components of the initial evaluation component set do not require data from a data source in order to be rendered, and adding respective child components to the initial evaluation component set based on the respective determinations, until all of the components of the initial evaluation component set:
      include a respective data request, or
      constitute a leaf component of the component hierarchy; and
   establishing the initial evaluation component set as the evaluation component set.

15. The method of claim 13, wherein the plurality of data items are retrieved from a plurality of data sources, the plurality of data sources including two or more of a database, a cache, and a web service.

16. The method of claim 15, wherein the plurality of data items are retrieved by a web server, and wherein the at least one data source is separate from the web server.

17. The method of claim 13, including rendering content for the webpage using the plurality of data items retrieved as the batch.

18. The method of claim 17, comprising generating a list of dependencies between the components of the component hierarchy from which the webpage is rendered, and storing the list of dependencies to be accessible by a dependency tracker.

19. The method of claim 13, including determining that the component hierarchy includes at least one component not previously evaluated, and selecting a further set of components from the component hierarchy as the evaluation component set.

20. The method of claim 13, including determining that all components of the component hierarchy have been evaluated, and transmitting the webpage, including the rendered content, to a client machine.

21. The method of claim 13, including identifying the component hierarchy responsive to a client request for the webpage.

22. The method of claim 13, wherein the selection of the evaluation component set comprises selecting at least one component from a selected hierarchical level of the component hierarchy.

23. The method of claim 13, wherein the selection of the evaluation component set comprises selecting at least one component within the component hierarchy not included in a previous evaluation component set, and closest to a root component of the component hierarchy.

24. The method of claim 13, wherein the data item further includes at least one of picture data and comment data.

* * * * *